(12) United States Patent
Tomoscheit et al.

(10) Patent No.: US 11,543,228 B2
(45) Date of Patent: Jan. 3, 2023

(54) RADIAL FORCE DEVICE FOR A CONTOUR MEASURING INSTRUMENT AND MEASURING SYSTEM

(71) Applicant: JENOPTIK Industrial Metrology Germany GmbH, Villingen-Schwenningen (DE)

(72) Inventors: Nils-Olaf Tomoscheit, Novalisstrasse (DE); Carsten Tuch, Rudolstadt (DE)

(73) Assignee: Jenoptik Industrial Metrology Germany GmbH, Villingen-Schwenningen (DE)

( * ) Notice: Subject to any disclaimer, the term of this patent is extended or adjusted under 35 U.S.C. 154(b) by 0 days.

(21) Appl. No.: 17/500,636

(22) Filed: Oct. 13, 2021

(65) Prior Publication Data

US 2022/0120550 A1 Apr. 21, 2022

(30) Foreign Application Priority Data

Oct. 15, 2020 (DE) .................... 10 2020 127 164.6

(51) Int. Cl.
*G01B 5/20* (2006.01)
(52) U.S. Cl.
CPC ..................... *G01B 5/20* (2013.01)
(58) Field of Classification Search
CPC ........................................................ G01B 5/20
USPC ........................................ 33/549, 551, 552
See application file for complete search history.

(56) References Cited

U.S. PATENT DOCUMENTS

| 2,696,675 | A | | 12/1954 | Case |
| 2,701,170 | A | | 2/1955 | Reason et al. |
| 3,931,681 | A | * | 1/1976 | Sybertz ............. B23Q 17/2225 |
| | | | | 33/634 |
| 3,943,634 | A | * | 3/1976 | Lindermann ........... B21B 38/10 |
| | | | | 33/657 |
| 4,444,069 | A | | 4/1984 | Dangschat |
| 4,916,824 | A | * | 4/1990 | Shimazutsu ........... G01B 7/287 |
| | | | | 33/553 |

(Continued)

FOREIGN PATENT DOCUMENTS

| DE | 1079499 B | 4/1960 |
| DE | 2909836 A1 | 9/1979 |

(Continued)

*Primary Examiner* — George B Bennett
(74) *Attorney, Agent, or Firm* — Muncy, Geissler, Olds & Lowe, P.C.

(57) ABSTRACT

A radial force device for a contour measuring instrument for measuring a contour of a shaft-shaped workpiece which can be rotated about an axis of rotation. The radial force device has a clamping body, a force introduction roller, at least one counter-roller and a coupling device. The clamping body is shaped for fitting radially around a workpiece portion, received in the contour measuring instrument, of the workpiece. The force introduction roller is designed to apply a mechanical radial force to the workpiece in order to apply a load to the workpiece, wherein the force introduction roller is mounted in a radially movable manner on the clamping body. The counter-roller is mounted in the clamping body and designed to support the workpiece during the application of the force. The coupling device is shaped for coupling the clamping body to the contour measuring instrument.

13 Claims, 3 Drawing Sheets

(56) References Cited

U.S. PATENT DOCUMENTS

| | | | | |
|---|---|---|---|---|
| 5,351,411 | A | * | 10/1994 | Gronskov ................ B61K 9/12 |
| | | | | 73/146 |
| 5,508,944 | A | | 4/1996 | Danielli |
| 5,535,143 | A | * | 7/1996 | Face ...................... G01B 5/201 |
| | | | | 73/104 |
| 5,678,963 | A | * | 10/1997 | Heimann .................. B23B 5/32 |
| | | | | 33/644 |
| 6,021,580 | A | * | 2/2000 | Manfredotti ........... G01B 5/146 |
| | | | | 33/549 |
| 6,324,902 | B1 | | 12/2001 | Kang |
| 6,578,280 | B2 | * | 6/2003 | Kinoshita ............. B65H 65/00 |
| | | | | 356/615 |
| 6,820,343 | B2 | * | 11/2004 | Waibel ................... G01C 15/02 |
| | | | | 33/666 |
| 7,159,477 | B2 | * | 1/2007 | Edwin .................... G01B 7/281 |
| | | | | 73/865.8 |
| 7,784,195 | B1 | * | 8/2010 | Hanna ................. G01B 21/045 |
| | | | | 33/554 |
| 9,297,629 | B2 | * | 3/2016 | Kohler ..................... G01B 3/14 |
| 10,801,826 | B2 | * | 10/2020 | Rattunde ................ G01B 5/207 |
| 2017/0209952 | A1 | * | 7/2017 | Teramae ................ B23K 31/00 |
| 2020/0309503 | A1 | | 10/2020 | Yasuno |

FOREIGN PATENT DOCUMENTS

| | | |
|---|---|---|
| DE | 3005147 B1 | 2/1981 |
| DE | 3310209 C2 | 10/1984 |
| DE | 69204853 T2 | 2/1996 |
| DE | 19602504 A1 | 4/1997 |
| DE | 19858722 A1 | 12/1999 |

\* cited by examiner

RADIAL FORCE DEVICE FOR A CONTOUR MEASURING INSTRUMENT AND MEASURING SYSTEM

This nonprovisional application claims priority under 35 U.S.C. § 119(a) to German Patent Application No. 10 2020 127 164.6, which was filed in Germany on Oct. 15, 2020, and which is herein incorporated by reference.

BACKGROUND OF THE INVENTION

Field of the Invention

The present invention relates to a radial force device for a contour measuring instrument and to a measuring system.

Description of the Background Art

With a contour measuring instrument, it is possible to measure a contour of a workpiece.

SUMMARY OF THE INVENTION

In is therefore an object of the invention to present a radial force device for a contour measuring instrument and a measuring system.

An advantage which can be achieved with the approach presented are that it provides a way of carrying out a measurement of a loaded workpiece during the recording of a measured value.

A radial force device for a contour measuring instrument for measuring a contour of a shaft-shaped workpiece which can be rotated about an axis of rotation is thus presented. With the aid of the radial force device, a radial force can be applied to the workpiece. The radial force device has a clamping body, a force introduction roller, at least one counter-roller and a coupling device. The clamping body is shaped for fitting radially around a workpiece portion, received in the contour measuring instrument, of the workpiece. The force introduction roller is designed to apply a mechanical radial force to the workpiece in order to apply a load to the workpiece, wherein the force introduction roller is mounted on the clamping body so as to be radially movable relative to the workpiece. The counter-roller is mounted in the clamping body and designed to support the workpiece during the application of the force. The coupling device is shaped for coupling the clamping body to the contour measuring instrument.

The radial force device presented here makes it possible to apply a mechanical force to a workpiece, wherein the force simulates an operating force in the operation envisaged for the workpiece, for example, in order to make possible an operational test, e.g. with respect to material durability and/or deformability for the workpiece. The force introduction roller can be rotatably mounted parallel to the axis of rotation, also referred to below as the "C axis", e.g., in a ball bearing. In this case, the force introduction roller can be mounted on the clamping body so as to be movable radially towards the axis of rotation, e.g. along a Y axis extending orthogonally to the axis of rotation. In this case, the counter-roller advantageously serves to stabilize the workpiece during the application of the force to ensure that the workpiece is not pushed out of its position between, for example, two centres of the contour measuring instrument. The counter-roller can also be rotatably mounted in a ball bearing parallel to the axis of rotation.

The clamping body can be substantially U-shaped for the purpose of fitting radially around the workpiece portion, wherein the force introduction roller and the counter-roller are arranged on respective opposite legs of the U-shaped clamping body. This creates a practical possibility for gripping the workpiece. Moreover, the opening of the U-shaped clamping body provides a practical means of pushing such a U-shaped clamping body onto a workpiece already positioned in the contour measuring instrument, or it is possible for the workpiece to be pushed into the opening of the U-shaped clamping body already coupled to the contour measuring instrument only when it is being positioned in the contour measuring instrument.

The radial force device can furthermore have at least one second counter-roller, mounted in the clamping body, for supporting the workpiece during the application of the force. This increases the stability of the workpiece in the contour measuring instrument during the application of the force.

According to an example, the counter-roller and the second counter-roller can be arranged in alignment. This increases a support surface counteracting the force and thus increases the stability for the workpiece in the contour measuring instrument during the application of the force.

The force introduction roller can be arranged in a horizontal plane between the counter-roller and the second counter-roller, in the case where they are arranged in alignment. For example, the force introduction roller can be arranged centrally between the counter-roller and the second counter-roller. This enables uniform support and the avoidance of tilting of the workpiece during the application of the force. Furthermore, it is possible to mount in the clamping body a further counter-roller, which is arranged on a horizontal plane with the counter-roller, and/or a further second counter-roller, which is arranged on a horizontal plane with the second counter-roller. In this way, when the force is applied to a central portion of one side of the workpiece, the workpiece can be supported, for example, on an upper portion on a side opposite said side between the counter-roller and the further counter-roller and can be supported on a lower portion on the side opposite said side between the second counter-roller and the further counter-roller.

The radial force device can furthermore have a component in which the force introduction roller is mounted. The component can be mounted in a radially movable manner on the clamping body. This creates a possibility for the movable mounting of the force introduction roller and for the protection of the latter.

The radial force device can have a movement reversing device, which is designed, in response to a movement of the component in a radial first direction, to move the clamping body in a second direction opposite to the first direction. The radial first direction can be a movement towards the workpiece along the Y axis in order subsequently to bring about the force on the workpiece. The movement reversing device thus advantageously also permits docking or even a force, counter to said force, of the opposite counter-roller/s towards the workpiece. This can only be brought about by the movement of the component holding the force introduction roller towards the workpiece.

The coupling device can be shaped to allow a longitudinal movement of the clamping body along a Y axis and/or a rotational movement about the Y axis and/or a longitudinal movement of the clamping body along an X axis and/or a rotational movement about the X axis, wherein the Y axis and the X axis are aligned orthogonally to each other and orthogonally to the axis of rotation. This allows several degrees of freedom, e.g. four degrees of freedom, with respect to the contour measuring instrument, as a result of which an adaptable closed flow of force between the radial force device and the workpiece is advantageously produced. In combination with the 4 degrees of freedom, the movement reversing device makes it possible to avoid or reduce transverse forces.

For example, the coupling device for coupling to the clamping body can have a ball guide unit with a bush, a ball cage arranged in the bush and a shaft, which is received or can be received in the ball cage and is shaped for insertion into an inlet opening in the clamping body. The bush can extend orthogonally to the axis of rotation, e.g. along the Y axis. Such a ball guide unit creates a movable connection between the clamping body and the measuring system, wherein the clamping body has two degrees of freedom, e.g. along and about the Y axis, with respect to the measuring system when the shaft is mounted in the clamping body via the inlet opening.

The coupling device can furthermore have a bolt for movably connecting the shaft to the clamping body. The bolt can extend orthogonally to the shaft, e.g. along the X axis. The shaft and the clamping body can each have receiving openings for the bolt in order to allow the movements along and about the X axis, thereby accordingly giving two further degrees of freedom, e.g. along and about the X axis.

The radial force device can have a force introduction unit for introducing the force. Thus, the force can be brought about either manually, for example by means of a toggle lever clamp, or in an automated way, e.g. pneumatically by means of pneumatic cylinders. A compression spring can be, for example, a component of the force supply device, irrespective of whether this takes place manually or in an automated way. This compression spring is responsible for introducing a defined force.

A measuring system having a radial force device in an example described above and the contour measuring instrument having two centres for rotatably clamping the workpiece along the axis of rotation is furthermore presented. Such a measuring system advantageously provides a rotatable way of receiving the workpiece and a possibility for carrying out a measurement of the workpiece while the latter is under load.

The measuring system can furthermore have a measuring device for measuring a contour of the workpiece. Thus, a measuring system having a plurality of functions for measuring and for carrying out a measurement of the workpiece while the latter is under load can be implemented.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
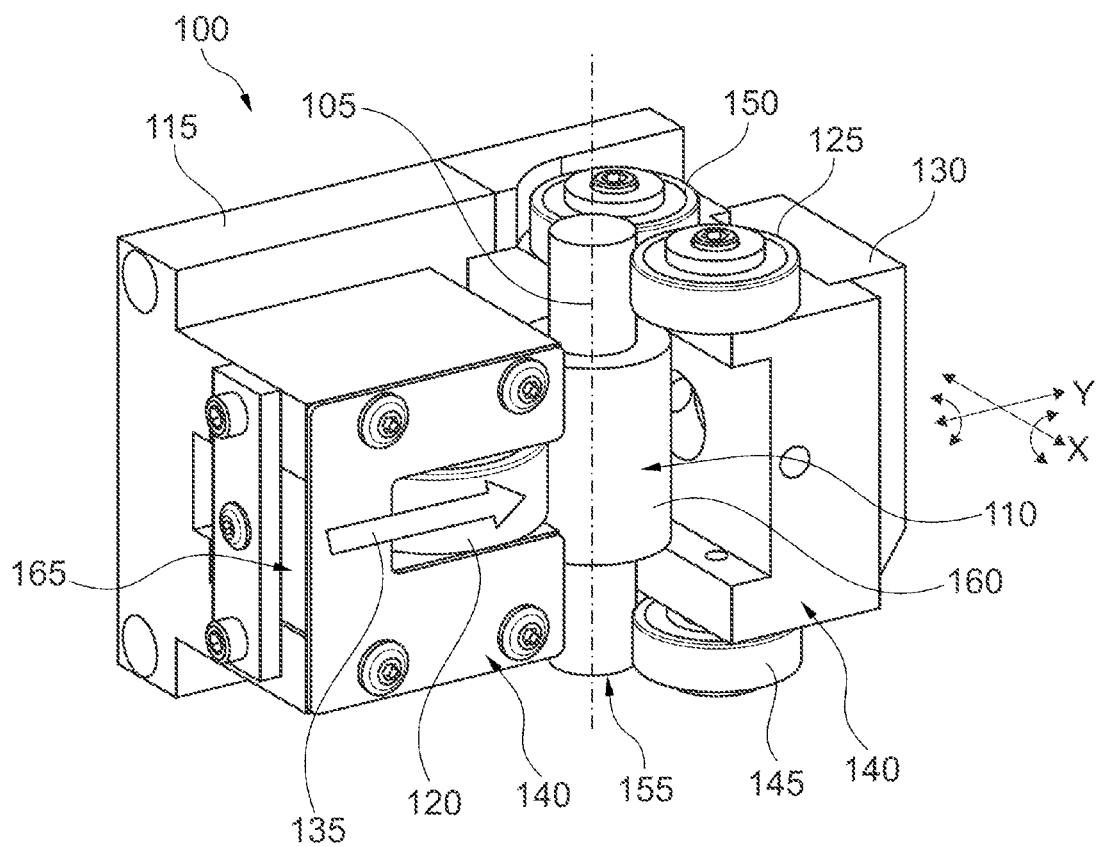
FIG. 1 shows a perspective side view of a radial force device for a contour measuring instrument for measuring a contour of a shaft-shaped workpiece which can be rotated about an axis of rotation.

FIG. 1 shows a perspective side view of a radial force device 100 for a contour measuring instrument for measuring a contour of a shaft-shaped workpiece 110 which can be rotated about an axis of rotation 105 in accordance with one exemplary embodiment.

Purely by way of example, the workpiece 110 according to this exemplary embodiment is received in the radial force device 100.

The radial force device 100 has a clamping body 115, a force introduction roller 120, at least one counter-roller 125 and a coupling device 130. The clamping body 115 is shaped for fitting radially around a workpiece portion, received in the contour measuring instrument, of the workpiece 110. The force introduction roller 120 is designed to apply a mechanical radial force 135 to the workpiece 110 in order to enable the workpiece 110 to be subjected to a load, wherein the force introduction roller 120 is mounted in a radially movable manner on the clamping body 115. The counter-roller 125 is mounted in the clamping body 115. The counter-roller 125 is provided for the purpose of supporting the workpiece 110 during the application of the force 135. The coupling device 130 is shaped for coupling the clamping body 115 to the contour measuring instrument 205 shown in FIG. 2.

According to this exemplary embodiment, the force introduction roller 120 is rotatably mounted parallel to the axis of rotation 105, also referred to below as the "C axis", e.g. in a ball bearing. According to this exemplary embodiment, the force introduction roller 120 is mounted on the clamping body 115 so as to be movable radially towards the axis of rotation 105, in this case along a Y axis extending orthogonally to the axis of rotation 105. According to this exemplary embodiment, the counter-roller 125 is also mounted rotatably parallel to the axis of rotation 105, e.g. in a ball bearing.

According to this exemplary embodiment, the clamping body 115 is substantially U-shaped for the purpose of fitting radially around the workpiece portion, wherein the force introduction roller 120 and the counter-roller 125 are arranged on respective opposite legs 140 of the U-shaped clamping body 115.

According to this exemplary embodiment, the radial force device 100 furthermore has at least one second counter-roller 145, mounted in the clamping body 115, for supporting the workpiece 110 during the application of the force 135. According to this exemplary embodiment, the counter-roller 125 and the second counter-roller 145 are arranged in alignment. Furthermore, the force introduction roller 120 according to this exemplary embodiment is arranged in a horizontal plane between the counter-roller 125 and the second counter-roller 145. In this case, the force introduction roller 120 according to this exemplary embodiment is arranged centrally between the counter-roller 125 and the second counter-roller 145. However, it is also possible for the force introduction roller 120 to be arranged asymmetrically. This depends on the workpiece. However, the force introduction roller 120 is always arranged between the counter-rollers 125, 145. Mounted in the clamping body 115, there is, according to this exemplary embodiment, a further counter-roller 150, which is arranged on a horizontal plane with the counter-roller 125, and/or a further second counter-roller 155, which is arranged on a horizontal plane with the second counter-roller 145. According to this exemplary embodiment, an upper portion of the workpiece 110 is contacted or can be contacted centrally between the counter-roller 125 and the further counter-roller 150. According to this exemplary embodiment, a lower portion of the workpiece 110 is contacted or can be contacted centrally between the second counter-roller 145 and the further second counter-roller 155. The force introduction roller 120 is arranged to make contact with a central portion 160 of the workpiece 110, which is arranged between the upper portion and the lower portion. According to this exemplary embodiment, an outer circumference of the central portion 160 is larger than an outer circumference of the upper portion and of the lower portion. Alternatively, the outer circumference of the central portion 160 may also be equal to or smaller than an outer circumference of the upper portion and of the lower portion.

According to this exemplary embodiment, the radial force device 100 furthermore has a component 165, wherein the force introduction roller 120 is mounted in the component 165. The component 165 is designed as a cuboidal block, for example. The component 165 is mounted in a radially movable manner on the clamping body 115.

The radial force device 100 according to this exemplary embodiment furthermore has a movement reversing device, which is designed, in response to a movement of the component 165 in a radial first direction, to move the clamping body 115 in a second direction opposite to the first direction. According to this exemplary embodiment, the radial first direction is a movement towards the workpiece 110 along the Y axis in order subsequently to bring about the force 135 on the workpiece 110. As a result, the clamping body moves in the second (Y direction) towards the workpiece 110, with the result that the counter-rollers 125, 145, 150, 155 are also in contact.

The radial force device 100 presented here implements a mechanism for the radial application of force to a shaft-shaped workpiece 110 which, according to this exemplary embodiment, is shaped as a camshaft. The radial force device 100 can be used for all measuring methods which require a radial application of force during measurement. For this purpose, according to one exemplary embodiment, the mechanical force 135 is applied locally in the form of a radial force to the shaft-shaped workpiece 110 during the measurement of the workpiece 110.

The radial force device 100 enables radial loading of workpieces 110 in the form of shafts without transverse force. Advantageously, there is only minimal wear on components which come into contact with the workpiece, such as the force introduction roller 120 and/or the counter-rollers 125, 145, 150, 155.

Figure 2:
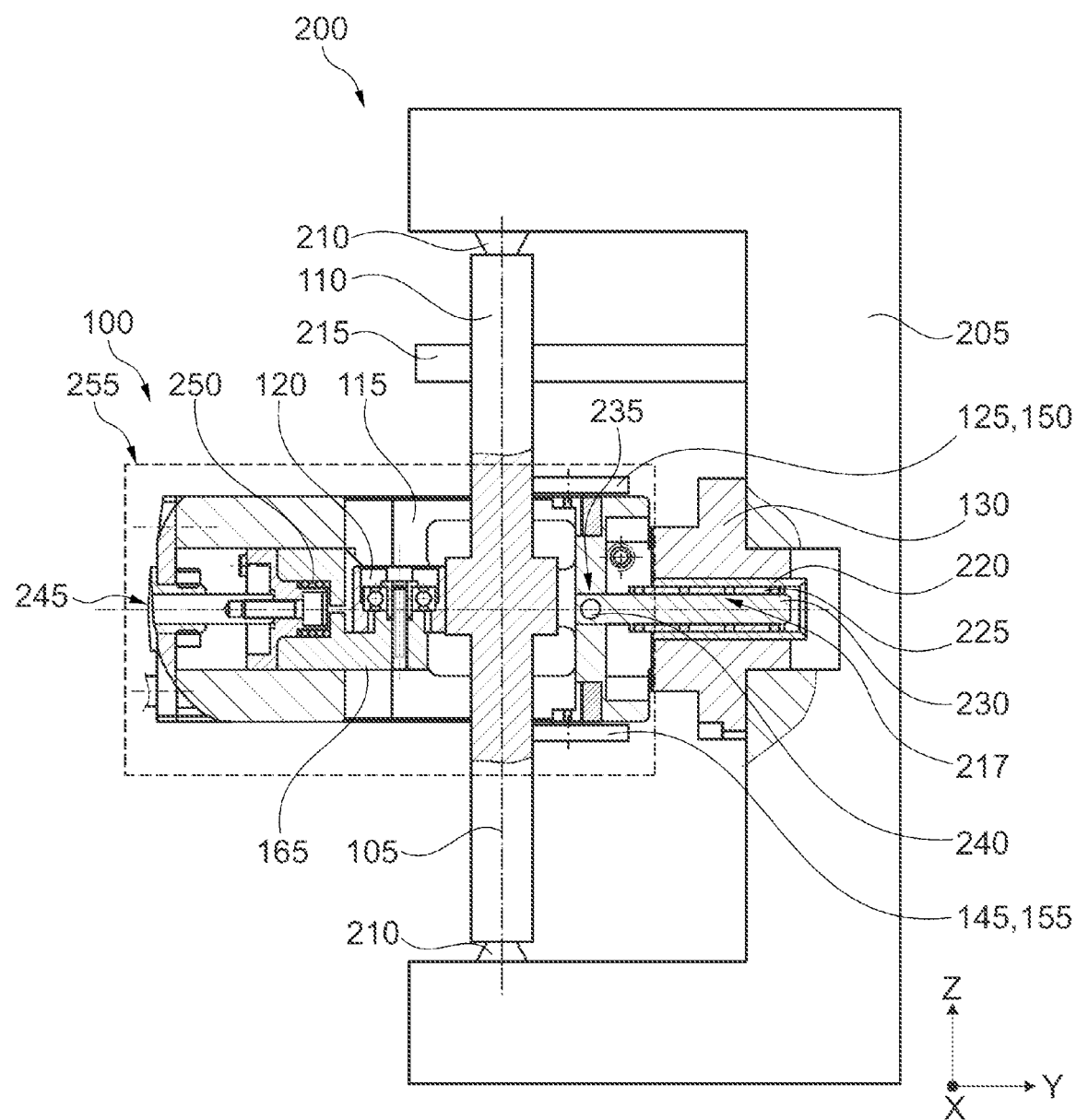
FIG. 2 shows a lateral cross-sectional view of a measuring system having a radial force device and a contour measuring instrument for measuring a contour of a shaft-shaped workpiece which can be rotated about an axis of rotation.

FIG. 2 shows a lateral cross-sectional view of a measuring system 200 having a radial force device 100 and a contour measuring instrument 205 for measuring a contour of a shaft-shaped workpiece 110 which can be rotated about an axis of rotation 105 in accordance with one exemplary embodiment. The radial force device 100 may be the radial force device 100 described in FIG. 1. The workpiece 110 may also be the workpiece 110 described in FIG. 1.

The contour measuring instrument 205 has two locating centres 210 for rotatably clamping the workpiece 110 along the axis of rotation 105. Optionally, the measuring system 200 according to this exemplary embodiment furthermore has a measuring device 215 for measuring the contour of the workpiece 110.

According to this exemplary embodiment, the coupling device 130 is shaped to allow a longitudinal movement of the clamping body 115 along the Y axis and/or a rotational movement about the Y axis and/or a longitudinal movement of the clamping body 115 along an X axis and/or a rotational movement about the X axis, wherein the Y axis and the X axis are aligned orthogonally to each other and orthogonally to the axis of rotation 105.

According to this exemplary embodiment, the coupling device 130 for coupling to the clamping body 115 has a ball guide unit 217 with a bush 220, a ball cage 225 arranged in the bush 220 and/or a shaft 230, which is received or can be received in the ball cage 225 and is shaped for insertion into an inlet opening 235 in the clamping body 115. According to this exemplary embodiment, the bush 220 extends orthogonally to the axis of rotation 105, in this case along the Y axis, for example. According to this exemplary embodiment, the coupling device 130 furthermore has a bolt 240 for movably connecting the shaft 230 to the clamping body 115. According to this exemplary embodiment, the bolt 240 extends orthogonally to the shaft 230 and/or the axis of rotation 105, in this case, for example, along the X axis. According to this exemplary embodiment, the shaft 230 and the clamping body 115 each have receiving openings for the bolt 240 in order to permit the movements along and about the X axis.

According to this exemplary embodiment, the radial force device 100 furthermore has a force introduction unit 245 for introducing the force. Furthermore, according to this exemplary embodiment, a compression spring 250 is accommodated between the force introduction unit 245 and the force introduction roller 120. The force is applied to the workpiece 110 by the compression spring 250. The force is introduced mechanically, e.g. by means of a toggle lever clamp, or pneumatically.

According to this exemplary embodiment, the radial force device 100 makes possible an automated option for measuring the workpiece 110 while the workpiece is being subjected to a load, thereby advantageously providing a time saving compared with manual measurement.

The clamping body 115, together with the component 165, can also be referred to as a pressure device 255.

The radial force device 100 presented here advantageously makes it possible to carry out the imposition of an additional radial force on workpieces 110 in the form of shafts during measurement in contour measuring instruments 205, also called "contour instruments". In this case, however, the workpiece 110, which is clamped vertically between the locating centres 210, is advantageously not pushed out of its clamping position on account of the transverse force loading caused by the force, and no transverse forces act on the locating centres 210.

Furthermore, attachment of the radial force device 100 to the contour measuring instrument 205 is achieved, wherein this device advantageously has four degrees of freedom with respect to the contour measuring instrument 205 according to this exemplary embodiment. This results in a closed flow of force between the radial force device 100 and the workpiece 110. Discs supported by ball bearings, here the force introduction roller 120 and the counter-rollers 125, 145, 150, 155, are used as elements in contact with the workpiece.

According to one exemplary embodiment, the radial force loading during the measurement of the workpiece 110 simulates an operating force which subsequently acts on the workpiece in the final installed state. Thus, it is possible to determine in advance whether the geometric tolerance specifications are adhered to under load.

The radial introduction of force into the workpiece 110 should not be carried out unilaterally since otherwise transverse forces occur at the locating centres 210 of the contour measuring instrument owing to the radial load, and thus there is a risk that the workpiece 110 will be pushed out of the locating centres 210. The radial force device 100 has therefore been developed, which does not transmit any transverse forces to the locating centres 210, despite radial loading on the workpiece 110.

According to this exemplary embodiment, the entire radial force device 100 comprises the coupling device 130 in the form of a "base body of the pressure device" and the pressure device 255, which is mounted in the "base body of the pressure device" via the ball guide unit 217. Thus, the pressure device 255 has two degrees of freedom, the Y translation axis and the Y rotation axis, with respect to the coupling device 130 which, according to this exemplary embodiment, is firmly screwed to a machine bed of the contour measuring instrument 205. Furthermore, the shaft 230 of the ball guide unit 217 according to this exemplary embodiment is mounted in the clamping body 115 via the bolt 240, giving rise to two further degrees of freedom, the X translation axis and the X rotation axis. The remaining two degrees of freedom, a Z translation along the Z axis and Z rotation about the Z axis, are blocked according to this exemplary embodiment. The clamping body 115 serves as a receptacle for the counter-rollers 125, 145, 150, 155, of which there are four by way of example, and the force introduction roller 120, wherein the force introduction roller 120 is mounted in the clamping body 115 so as to be displaceable in the Y direction via the component 165, which is cuboidal here by way of example. For example, an axle of the force introduction roller 120 is received by a through opening of the component 165. According to this exemplary embodiment, the counter-rollers 125, 145, 150, 155 are firmly screwed to the clamping body 115 and/or, according to this exemplary embodiment, in each case two counter-rollers 125, 150 are arranged above and two counter-rollers 145, 155 are arranged below the force introduction roller 120, when viewed in the Z direction. According to this exemplary embodiment, the force introduction roller 120 and/or the four counter-rollers 125, 145, 150, 155 themselves are each mounted by means of a ball bearing.

In a functional example, the workpiece 110 is received between the two locating centres 210. In order to apply the simulated operating force to the workpiece 110 to be measured, the force is introduced via the force introduction roller 120, which can be displaced in the +Y direction and is supported on the clamping body 115. As a result, the entire clamping body 115 is guided in the –Y direction via the ball guide unit 217 until the counter-rollers 125, 145, 150, 155 also rest against the workpiece 110. According to one exemplary embodiment, the guiding of the clamping body 115 in the –Y direction is accomplished by the movement of the force introduction roller 120 onto the workpiece 110. The movement of the force introduction roller 120 can again be accomplished manually, e.g. by means of a toggle lever clamp, or pneumatically, e.g. by means of a pneumatic cylinder. The required radial load is applied to the workpiece 110 by the compression spring 250. In this case, the flow of force takes place from the clamping body 115 to the force introduction roller 120, via the workpiece 110, to the counter-rollers 125, 145, 150, 155 and back to the clamping body 115. By virtue of the four degrees of freedom available, no transverse forces act on the workpiece 110 to be measured, thereby making possible a radial load free of transverse forces relative to the machine bed of the workpiece 110.

Figure 3:
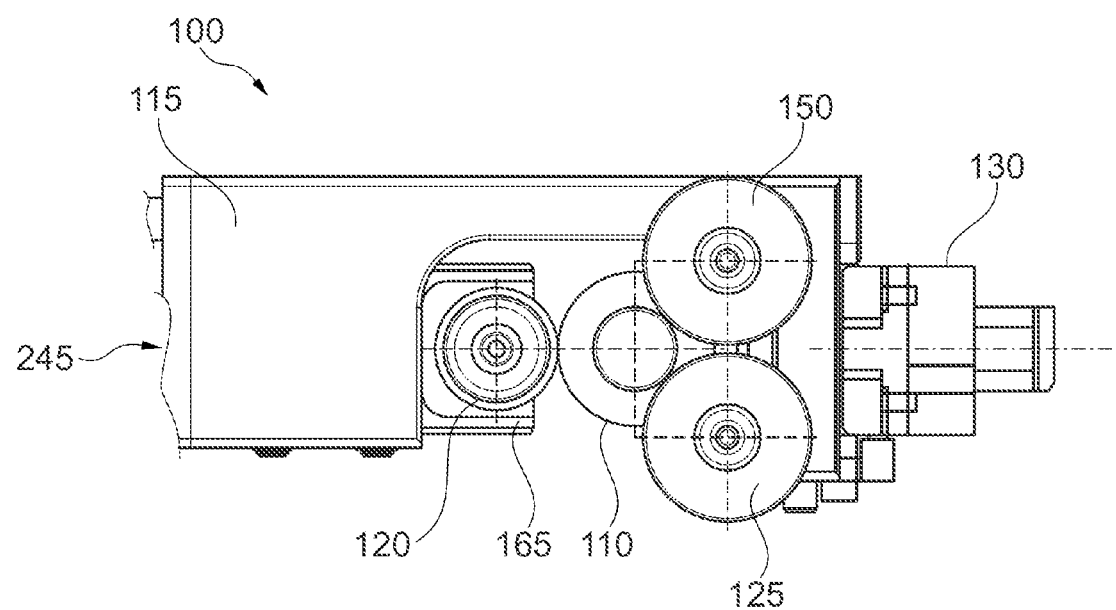
FIG. 3 shows a plan view of a radial force device according to an exemplary embodiment.

FIG. 3 shows a plan view of a radial force device 100 according to one exemplary embodiment. This may be the radial force device 100 described in FIG. 1 or 2.

The exemplary embodiments described and shown in the figures are selected purely by way of example. Different exemplary embodiments can be combined with one another completely or in respect of individual features. Moreover, one exemplary embodiment can be supplemented by features of another exemplary embodiment.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A radial force device for a contour measuring instrument for measuring a contour of a shaft-shaped workpiece that is adapted to be rotated about an axis of rotation, the radial force device comprising:
    a clamping body for fitting radially around a workpiece portion received in the contour measuring instrument of the workpiece;
    a force introduction roller to apply a mechanical radial force to the workpiece in order to apply a load to the workpiece, the force introduction roller being mounted on the clamping body so as to be radially movable relative to the workpiece;
    at least one counter-roller mounted in the clamping body for supporting the workpiece during the application of the force; and
    a coupling device for coupling the clamping body to the contour measuring instrument.

2. The radial force device according to claim 1, wherein the clamping body is substantially U-shaped for the purpose of fitting radially around the workpiece portion, and wherein the force introduction roller and the counter-roller are arranged on respective opposite legs of the U-shaped clamping body.

3. The radial force device according to claim 1, further comprising at least one second counter-roller mounted in the clamping body, for supporting the workpiece during the application of the force.

4. The radial force device according to claim 3, wherein the counter-roller and the second counter-roller are arranged in alignment.

5. The radial force device according to claim 3, wherein the force introduction roller is arranged in a horizontal plane between the counter-roller and the second counter-roller.

6. The radial force device according to claim 1, further comprising a component, wherein the force introduction roller is mounted in the component, which is mounted in a radially movable manner on the clamping body.

7. The radial force device according to claim 6, further comprising a movement reversing device, which is designed, in response to a movement of the component in a radial first direction, to move the clamping body in a second direction opposite to the first direction.

8. The radial force device according to claim 1, wherein the coupling device is shaped to allow a longitudinal movement of the clamping body along a Y axis and/or a rotational movement about the Y axis and/or a longitudinal movement of the clamping body along an X axis and/or a rotational movement about the X axis, and wherein the Y axis and the X axis are aligned orthogonally to each other and orthogonally to the axis of rotation.

9. The radial force device according to claim 1, wherein the coupling device for coupling to the clamping body has a ball guide unit with a bush, a ball cage arranged in the bush and/or a shaft, which is received or adapted to be received in the ball cage and is shaped for insertion into an inlet opening in the clamping body.

10. The radial force device according to claim 9, wherein the coupling device includes a bolt for movably connecting the shaft to the clamping body.

11. The radial force device according to claim 1, further comprising a force introduction unit for introducing the force.

12. A measuring system comprising the radial force device according to claim 1 and a contour measuring instrument having two locating centres for rotatably clamping the workpiece along the axis of rotation.

13. The measuring system according to claim 12, further comprising a measuring device for measuring a contour of the workpiece.

\* \* \* \* \*